United States Patent [19]

Kanzaki et al.

[11] 3,926,729

[45] Dec. 16, 1975

[54] METHOD FOR PRODUCING DEACETYLCEPHALOSPORIN C

[75] Inventors: Toshihiko Kanzaki, Hyogo; Yukio Fujisawa, Osaka; Hideo Shirafuji; Kiyoshi Nara, both of Kyoto; Masahiko Yoneda, Hyogo, all of Japan

[73] Assignee: Takeda Chemical Industries, Ltd., Japan

[22] Filed: Apr. 10, 1973

[21] Appl. No.: 349,849

[30] Foreign Application Priority Data
Apr. 15, 1972 Japan.............................. 47-38071

[52] U.S. Cl............................. 195/36 C; 195/36 R
[51] Int. Cl.².......................................... C12D 9/04
[58] Field of Search........................ 195/36 R, 36 C

[56] References Cited
UNITED STATES PATENTS

| | | | |
|---|---|---|---|
| 3,139,388 | 6/1964 | Platt et al........................... | 195/36 R |
| 3,239,394 | 3/1966 | Walton................................ | 195/36 R |
| 3,847,742 | 11/1974 | Higgens et al.................... | 195/36 R |

OTHER PUBLICATIONS

Huber et al., Applied Microbiology, pp. 1011–1014, (1968).

*Primary Examiner*—Alvin E. Tanenholtz
*Attorney, Agent, or Firm*—Wenderoth, Lind & Ponack

[57] ABSTRACT

Deacetylcephalosporin C is produced by cultivating a microorganism which belongs to genus Cephalosporium and is capable of producing deacetylcephalosporin C and accumulating it in the culture broth. The accumulated deacetylcephalosporin C can easily be recovered from the culture broth.

6 Claims, No Drawings

METHOD FOR PRODUCING DEACETYLCEPHALOSPORIN C

This invention relates to a method for fermentative production of deacetylcephalosporin C (hereafter sometimes referred to briefly as DCPC).

The cephalosporin compounds derived from DCPC, such as cephalothin and cephaloridine, are clinically highly estimated as antibiotics effective against infections with gram-positive or gram-negative bacteria and, particularly, against the diseases caused by bacteria which have acquired resistance to various antibiotics. Deacetylcephalosporin C is very important as a starting material for the synthesis of such cephalosporin compounds. New cephalosporin derivatives such as 3-formylcephalosporin derivatives, e.g. 3-formyl-7-phenylacetamido-ceph-2-em-4-carboxylic acid and 3-formyl-7-phenylacetamido-ceph-3-em-4-carboxylic acid are also derived from DCPC. Moreover, DCPC is useful as a starting material in the synthesis of 3-chloroacetoxymethyl-cephalosporin derivatives or 3-methoxy-methylcephalosporin C. Thus DCPC is more expected than ever to be exploited as a starting material for the synthesis of various 3-substituted cephalosporin compounds.

Hitherto, DCPC has been produced by enzymatic deacetylation of cephalosporin C (hereafter sometimes referred to briefly as CPC) which is obtained by fermentation utilizing, for example, *Cephalosporium acremonium* CMI-49137 or its mutant 8650 (ATCC-14553). The enzymatic deacetylation has been conducted by contacting CPC with an enzyme produced by a microorganism belonging to, for example, the genus *Streptomyces* or *Bacillus* (described in U.S. Pat. No. 3,304,236). The said processes were commercially at a disadvantage because of necessity of two fermentation steps, namely the production of CPC and the deacetylation of the thus produced CPC.

Though it has been reported that a trace amount of DCPC is found in the fermentation broth obtained by the process of CPC fermentation, it is clarified that the DCPC is formed due to non-enzymatic hydrolysis of CPC(Applied Microbiology; 16, 1011–1014, (1968), F.M. Huber et al.).

Thus, for producing DCPC directly in a large amount, it has been necessary to approach to the problem from the completely different conception from the known processes.

Further studies by the present inventors have led to a new finding that certain microorganisms belonging to the genus *Cephalosporium* can directly produce DCPC in the culture broth in a large amount.

This invention provides an industrially advantageous method for producing DCPC, by cultivating a microorganism which belongs to the genus *Cephalosporium* and is capable of producing directly deacetylcephalosporin C until DCPC is substantially accumulated, and recovering the so-accumulated deacetylcephalosporin C from the culture broth.

The microorganisms which can be employed in this invention are selected from the genus *Cephalosporium* and is capable of producing directly DCPC. The said microorganisms can be isolated from natural sources and be obtained from the type culture collections. Any of mutants which can be artificially induced by mutagenic treatments from CPC-producing strains can be used as long as they have acquired the aforementioned ability.

To judge whether a microorganism is capable of producing DCPC, the following procedure, for instance, can be employed.

It has been known that *Alcaligenes faecalis* ATCC-8750 is only weakly sensitive to DCPC though it is highly sensitive to CPC. On the other hand, both CPC and DCPC are readily decomposed by cephalosporinase, and then one can easily ascertain whether they have been decomposed or not from whether their ultraviolet absorptions at 260 m$\mu$ have disappeared or not. Therefore, the desired strain which is capable of producing DCPC can be obtained by selecting any microorganisms capable of synthesizing a substance which shows very weak activity against *Alcaligenes faecalis* ATCC-8750 but whose UV absorption at 260 m$\mu$ disappears upon treatment with cephalosporinase. Further, DCPC-producing strains can be identified by inspecting the electrophoregrams of their culture broths. Thus, if such a culture sample is subjected to electrophoresis on, for example Toyo No. 51A filter-paper (Toyo Kagaku Sangyo, Co. Ltd.) in a phosphate buffer (pH 6.5; 1/15M) at a voltage gradient of 45 V/cm for 1.5 hour, DCPC is detected by ultraviolet absorption. That is, CPC and DCPC give separated spots under ultraviolet rays. As a result, one can identify the selective formation of DCPC in the culture broth of a DCPC-producing strain.

As typical examples of the microorganisms employable in this invention, *Cephalosporium acremonium* C-128, *Cephalosporium acremonium* No. 132 and *Cephalosporium* sp. C-28 may be mentioned. They produce substantially no CPC or only a small amount of CPC removable from the final product, i.e. DCPC, without any special separating process of CPC from DCPC. Of these microorganisms, *Cephalosporium* sp. C-28 and *Cephalosporium acremonium* No. 132 are those which can be conveniently employed for the purpose of this invention. *Cephalosporium* sp. C-28 has been deposited at the Institute for Fermentation, Osaka, Japan under the accession number of IFO-9537, and at Fermentation Research Institute, the Agency of Industrial Science and Technology, Chiba, Japan under the deposit number of Ferm-P No. 1430. *Cephalosporium* sp. C-28 and *Cephalosporium acremonium* No. 132 are deposited at American Type culture Collection, Maryland U.S.A. under the deposition number of ATCC-20370 and ATCC-20371, respectively.

The microbiological characteristics of *Cephalosporium* sp. C-28 are shown below;

1. Characteristics on agar media

1. Malt extract agar

Growth poor, surface irregularly wrinkled, colorless to light brown. Reverse of colony is colorless to light brown. Aerial mycelium scanty. No soluble pigment produced.

2. Potato glucose agar

Growth poor, restricted and raised, colorless to light brown. Reverse is colorless to light brown. Aerial mycelium scanty. No soluble pigment.

3. Oatmeal agar

Growth moderate, diffuse, colorless. Reverse is colorless. Aerial mycelium scanty. No soluble pigment produced.

4. Glucose bouillon agar

Growth moderate, diffuse, colorless to light brown. Reverse is colorless to light brown. Aerial mycelium scanty. No soluble pigment.

2. Microscopic characteristics

Aerial hyphae 1.5–3.0$\mu$ wide, branched and hyaline. Conidiophores erect from aerial or vegetative hyphae at right angle, 30–70$\mu$ long and 1.5–2.0$\mu$ wide; a mass of conidia, 8–14$\mu$ in diameter, is formed at tip. Conidia are elliptical, somewhat pointed at each end, unicellular, hyaline, 2–3$\mu$ × 8–13$\mu$.

On malt extract agar, potato glucose agar and oatmeal agar, only reduced conidial formation is observed. On glucose bouillon agar, conidia develop in abundance.

The mutant employable in this invention can be derived from, for example, *Cephalosporium polyaleurum* Y-505 (ATCC-20360, Ferm-P-No. 1160) or *Cephalosporium* sp. ATCC-14553, both of which are CPC-producing strains. To obtain the desired mutant, one may employ any of the physical or chemical treatments which are commonly used for the artificial mutation of microorganisms, e.g. ultraviolet ray irradiation or treatment with an appropriate chemical such as sodium nitrite or N-methyl-N'- nitro-N-nitrosoguanidine.

The microbiological characteristics of *Cephalosporium acremonium* No. 132 induced from *Cephalosporium acremonium* ATCC-14553 are as the same as those of *Cephalosporium acremonium* ATCC-14553.

The cultivation of the microorganism may be carried out either on a solid or a liquid medium, and it is recommended to employ a liquid medium for an industrial purpose. When the liquid medium is employed, the cultivation may be conducted under aerobic conditions with shaking or agitation.

The culture medium to be employed in this invention contains assimilable carbon sources, digestible nitrogen sources, inorganic salts and stimulation factors.

The carbon sources employable in this invention may be any of the conventional sources exemplified by, for example, glucose, sucrose, starch, soluble-starch and blackstrap molasses, n-paraffin, acetic acid, ethanol, glycerol and sorbitol.

The nitrogen sources employable in this invention may be, for example, natural products or processed materials of them (e.g. peptone, meat extract, casein, cornsteep liquor, defatted soybean powder, dry yeast, yeast extract, soybean flour, cottonseed meal, rice bran, wheat bran, etc.), ammonium salts of organic acids (e.g. ammonium succinate, ammonium tartrate, ammonium acetate), inorganic nitrogen compounds (e.g. ammonium chloride, ammonium sulfate, ammonium phosphate) and organic nitrogen compounds (e.g. urea).

The inorganic salts employable in this invention may be, for example, metallic salts such as sulfate, nitrate, chloride, carbonate and phosphate of potassium, magnesium or calcium.

The stimulation factor employable in this invention may be, for example, methionine, crysteine, cystine, thiosulfate, methyl oleate, lard oil, etc. Among those factors, methionine is very excellent for promoting the productivity of DCPC.

The amount of methionine in the culture medium is preferably from 0.05 to 3.0 weight/volume %, more preferably from 0.1 to 2.0 weight/volume %. Both D- and L- forms of methionine are effective in the production of DCPC.

The conditions for cultivation, e.g. cultivation temperature, pH of the medium and cultivation period, are appropriately selected so that the microorganism employed may accumulate DCPC in the maximum. For example, the cultivation is advantageously carried out at a temperature ranging from 15° to 45°C, preferably from 18° to 38°C, at a pH of from 2 to 10, preferably from 4 to 9 and for from 10 to 360 hours, preferably from 96 to 240 hours.

The separation of DCPC from the culture broth is conveniently carried out by per se conventional means, for example, by filtering the culture broth, washing the cells with water and then recovering DCPC from the mixture of the filtrate and the washing. In order to purify the thus accumulated DCPC from the DCPC-containing fluid, any methods known per se for example, resin- or activated carbon-chromatography or gel filtration are employable. For example, to the filtrate is added penicillinase to decompose cephalosporin N. The filtrate is applied to a column of weakly basic ion-exchange resin on which DCPC is adsorbed. The adsorbed DCPC is eluted with an appropriate solvent such as an ammonium acetate buffer solution and the DCPC-containing fraction is collected. The DCPC fraction is concentrated under reduced pressure and applied to a column of activated carbon to adsorb the DCPC. After washing with water, DCPC is eluted with an appropriate solvent such as an equivolume mixture of acetone and water. The DCPC-containing fraction is harvested and concentrated under reduced pressure, followed by the addition of excess acetone. The said procedure gives crude powder of DCPC.

If desired or necessary, some of the steps in the said procedure may be repeated. Finally, to the fraction is added NaOH-solution to neutralize and is added ethanol, whereby sodium salt of DCPC can be separated as crystals.

For further explanation of the present invention, the following examples are given, wherein "part(s)" are based on weight unless otherwise noted and the relationship between "part(s)" and "part(s) by volume" corresponds to that between "gram(s)" and "milliliter(s)." The terms "$\mu$g," "r.p.m.," "M" and "%" mean microgram(s), revolution(s) per minute, molar concentration and percent, respectively. Percentages are on weight per volume basis unless otherwise stated.

EXAMPLE 1

Into a fermenter of 2,000 parts by volume capacity is poured 500 parts by volume of a seed-culture medium comprising 3.0 % of sucrose, 1.5 % of meat extract, 0.5 % of corn steep liquor and 0.15 % of $CaCO_3$ and, after sterilization, is inoculated with *Cephalosporium* sp. C-28 (ATCC-20370.). The inoculated medium is cultivated with shaking at 28°C for 72 hours.

Into a fermentation tank of 50,000 parts by volume capacity is poured 30,000 parts by volume of a fermentation medium comprising 3.0 % of sucrose, 3.2 % of raw soybean flour, 0.5 % of DL-methionine and 0.15 % of $CaCO_3$. The medium is then sterilized and cooled. The fermentation medium is aseptically inoculated with the above seed-culture and cultivated at 28°C under stirring and aeration (100 % V/V aeration per minute; 200 r.p.m.). After 132 hours of cultivation, the fermentation broth is filtered. Thus, 26,000 parts by volume of the filtrate is obtained. The filtrate is assayed for CPC and DCPC by the following principle and procedure.

When CPC and DCPC are subjected to electrophoresis under the conditions hereinbefore described, they migrate about 15 cm and 17 cm, respectively, anodewise. After the electrophoretic run, the CPC and DCPC zones of filter paper are cut out and independently extracted with water. The extracts are then assayed for absorbances at 260 m$\mu$. From the absorbancies thus obtained, it is found that the filtrate contains 1,900 $\mu$g./ml of DCPC and is devoid of any trace of CPC.

To 26,000 parts by volume of the above filtrate, penicillinase (manufactured by Schwarz/Mann Biochemicals.) is added to effect a complete decomposition of cephalosporin N. Immediately thereafter, the filtrate is applied to a column of Amberlite IRA-900(acetate-form, Rohm and Haas Co.) on which DCPC is to be adsorbed. The adsorbed DCPC is eluted with ammonium acetate buffer (pH 5.0; 0.2M) and the DCPC-containing fraction is harvested. The DCPC fraction is concentrated under reduced pressure to become 13,000 parts by volume. The concentrate is passed over a column packed with 1,800 parts by volume of chromatographic carbon (obtained by the carbonization and subsequent steam activation of saw dust, grain size: about 40 mesh, surface area: 1,460 m$^2$/g) at a space velocity of 1.0 per hour. After the column is washed with water, the adsorbed DCPC is eluted with 9,000 parts by volume of 50% (v/v) aqueous acetone. The DCPC fraction is pooled and concentrated under reduced pressure, followed by the addition of excess acetone. The procedure yields crude powder of DCPC. Then the crude powder is dissolved in water, adsorbed on Dowex 1 × 2 (acetate-form, Dow Chemical Co.) and eluted with 1,000 parts by volume of the same ammonium acetate buffer as above. Then, the eluate is passed over a column in a manner similar to the above treatment.

The DCPC fraction is pooled and concentrated under reduced pressure. After the concentrate is neutralized with NaOH-solution, ethanol is added to become 70 %(V/V), whereupon sodium salt of DCPC is precipitated as crystals. The crystals are harvested by filtration and dried, whereby 13.0 g. of crystals of DCPC is obtained. The above crystalline product is further recrystallized and, then the recrystallized product is compared with a DCPC sample obtained by enzymatic conversion of CPC.

In respects of antibacterial spectrum, paper chromatogram, thin-layer chromatogram, ultraviolet spectrum, infrared spectrum, nuclear magnetic resonance spectrum, etc., the crystals of this invention are in complete agreement with the authentic sample. The elementary analysis of the product (C 36.9; H 5.6; N 9.3; S 7.0) is also found to be in good agreement with the data given in Biochem. J. 81, 591, 1961(J. D'A. Jeffery et al.).

EXAMPLE 2

Into a fermenter of 200 parts by volume capacity is poured 30 parts by volume of a seed-culture medium containing 3.0 % of sucrose, 1.5 % of meat extract, 0.5 % of corn steep liquor and 0.15 % of CaCO$_3$ and, after sterilization, is inoculated with *Cephalosporium acremonium* No. 132 (ATCC-20371) which has been derived from *Cephalosporium acremonium* ATCC-14553 by ultraviolet light treatment. The inoculated fermenter is incubated at 28°C for 72 hours with stirring.

Into a fermenter of 200 parts by volume capacity is poured 20 parts by volume of fermentation medium comprising 3.0 % of sucrose, 3.2 % of raw soybean flour, 0.5 % of DL-methionine and 0.15 % of CaCO$_3$. The medium is then sterilized in a conventional manner and cooled. The above seed-culture is aseptically transferred to the fermenter and cultivation was carried out at 28°C for 144 hours. The fermentation broth is filtered. The filtrate is assayed by the same method as in Example 1, whereby the filtrate is found to contains 1,300 $\mu$g./ml of DCPC and is devoid of any trace of CPC.

The cultivation is carried out by the use of *Cephalosporium* sp. C-28 (ATCC-20370), *Cephalosporium acremonium* No. 132(ATCC-20371), respectively, in the same manner as in Example 2 except that the amount of methionine is varied. The obtained fermentation broths are filtered and the filtrates are subjected to the assay as described in Example 1. The relation between the amount of methionine used and the amount of deacetylcephalosporin C produced are shown in Table 1.

As shown in Table 1, DL-methionine serves to increase markedly the production amount of DCPC.

Table 1

| DL-methionine in culture broth (wt./vol. %) | Cephalosporium sp. C-28 | Cephalosporium acremonium No.132 |
| --- | --- | --- |
| 0 | below 100 $\mu$g/ml | below 100 $\mu$g/ml |
| 0.05 | 450 $\mu$g/ml | 250 $\mu$g/ml |
| 0.1 | 1,100 $\mu$g/ml | 600 $\mu$g/ml |
| 0.2 | 1,550 $\mu$g/ml | 1,000 $\mu$g/ml |
| 0.5 | 1,800 $\mu$g/ml | 1,250 $\mu$g/ml |
| 1.0 | 1,450 $\mu$g/ml | 850 $\mu$g/ml |
| 2.0 | 1,000 $\mu$g/ml | 700 $\mu$g/ml |
| 3.0 | 700 $\mu$g/ml | 450 $\mu$g/ml |

What we claim is:

1. A method for producing deacetylcephalosporin C which comprises cultivating a microorganism which belongs to the genus *Cephalosporium* and is capable of producing directly deacetylcephalosporin C in a culture medium until deacetylcephalosporin C is accumulated in substantial amounts, and recovering deacetylcephalosporin C from the culture broth.

2. A method according to claim 1, wherein the microorganism is a deacetylcephalosporin C-producing mutant derived from cephalosporin C-producing strains.

3. A method according to claim 1, wherein the microorganism is *Cephalosporium acremonium*.

4. A method according to claim 1, wherein the microorganism is *Cephalosporium* sp. C-28(ATCC-20370).

5. A method according to claim 1, wherein the microorganism is *Cephalosporium acremonium* No. 132(ATCC-20371).

6. A method according to claim 1, wherein the culture medium contains from 0.05 to 3.0 weight/volume percent of methionine.

* * * * *